(12) United States Patent
Galla et al.

(10) Patent No.: US 10,632,807 B2
(45) Date of Patent: Apr. 28, 2020

(54) POWERED VEHICLE SUSPENSION ASSEMBLY

(71) Applicant: SAF-HOLLAND, Inc., Holland, MI (US)

(72) Inventors: Jeffrey Galla, Norton Shores, MI (US); Jason Heath, Grand Rapids, MI (US); Jason Klein, Fruitport, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 47 days.

(21) Appl. No.: 15/547,381

(22) PCT Filed: Mar. 1, 2017

(86) PCT No.: PCT/US2017/020133
§ 371 (c)(1),
(2) Date: Jul. 28, 2017

(87) PCT Pub. No.: WO2017/160502
PCT Pub. Date: Sep. 21, 2017

(65) Prior Publication Data
US 2018/0272819 A1    Sep. 27, 2018

Related U.S. Application Data

(60) Provisional application No. 62/309,736, filed on Mar. 17, 2016.

(51) Int. Cl.
*B60G 7/00*    (2006.01)
*F16F 1/387*    (2006.01)
(Continued)

(52) U.S. Cl.
CPC ............. *B60G 7/001* (2013.01); *B60G 9/003* (2013.01); *B60G 9/02* (2013.01); *F16F 1/387* (2013.01);
(Continued)

(58) Field of Classification Search
CPC .......... B60G 7/001; B60G 9/003; B60G 9/02; B60G 2204/41; B60G 2206/601; B60G 2206/602; B60G 2200/31
See application file for complete search history.

(56) References Cited

U.S. PATENT DOCUMENTS 1,241,361 A    9/1917    Ellwein
5,820,156 A  * 10/1998    Vandenberg ............. B60G 5/00
                                                                                280/676
(Continued)

OTHER PUBLICATIONS

Renault Trucks; Long Haul Range T; Brochure; Feb. 2016; Ref. 58 02 005 342.
(Continued)

*Primary Examiner* — Karen Beck
(74) *Attorney, Agent, or Firm* — Price Heneveld LLP (57) ABSTRACT

A powered vehicle suspension assembly includes a mounting bracket configured to be attached to a powered vehicle frame rail, a trailing arm assembly including a substantially rigid trailing arm having a first end pivotably coupled with the mounting bracket and a second end, where the trailing arm assembly is configured to operably couple with a powered vehicle axle arrangement, a spring arrangement supported by the second end of the trailing arm, and a structural reinforcement cross-member configured to extend between and couple with a pair of powered vehicle frame rails.

21 Claims, 6 Drawing Sheets

(51) Int. Cl.
*F16F 1/38* (2006.01)
*B60G 9/00* (2006.01)
*B60G 9/02* (2006.01)
B60G 5/04 (2006.01)
B60G 11/27 (2006.01)

(52) U.S. Cl.
CPC .......... *F16F 1/3835* (2013.01); *F16F 1/3863* (2013.01); *B60G 5/04* (2013.01); *B60G 9/00* (2013.01); *B60G 11/27* (2013.01); *B60G 2200/31* (2013.01); *B60G 2200/422* (2013.01); *B60G 2202/152* (2013.01); *B60G 2204/126* (2013.01); *B60G 2204/143* (2013.01); *B60G 2204/148* (2013.01); *B60G 2204/15* (2013.01); *B60G 2204/41* (2013.01); *B60G 2204/4104* (2013.01); *B60G 2204/4302* (2013.01); *B60G 2204/4306* (2013.01); *B60G 2206/11* (2013.01); *B60G 2206/16* (2013.01); *B60G 2206/601* (2013.01); *B60G 2206/602* (2013.01); *B60G 2300/026* (2013.01)

(56) References Cited

U.S. PATENT DOCUMENTS

| | | | | |
|---|---|---|---|---|
| 6,808,192 B1* | 10/2004 | Bol | ........................ | B60G 9/003 280/124.116 |
| 7,077,411 B2* | 7/2006 | Peters | ...................... | B60G 5/02 280/124.132 |
| 7,090,208 B1* | 8/2006 | Kiddle | ..................... | B60G 7/02 267/140.12 |
| 7,111,862 B1 | 9/2006 | Eng | | |
| 7,416,200 B2* | 8/2008 | Hass | ...................... | B60G 7/001 280/124.11 |
| 7,726,673 B2* | 6/2010 | Saieg | ..................... | B60G 7/001 280/124.116 |
| 8,371,596 B2* | 2/2013 | Johnson | ................. | B60G 9/022 280/124.116 |
| 8,678,407 B2* | 3/2014 | Eveley | ................... | B60G 7/001 280/124.11 |
| 8,910,960 B2 | 12/2014 | Fowler et al. | | |
| 8,973,909 B2 | 3/2015 | Noble et al. | | |
| 9,511,641 B2* | 12/2016 | Drewes | .................. | B60G 9/003 |
| 9,662,949 B2* | 5/2017 | Spielmann | ............. | B60G 7/001 |
| 2004/0021290 A1* | 2/2004 | Hicks | ....................... | B60G 9/00 280/438.1 |
| 2004/0084822 A1* | 5/2004 | Collyer | .................. | B60G 11/12 267/293 |
| 2004/0183271 A1* | 9/2004 | Galazin | .................. | B60G 9/003 280/124.128 |
| 2005/0057014 A1* | 3/2005 | Ramsey | ................. | B60G 7/001 280/124.116 |
| 2006/0163788 A1* | 7/2006 | Kiddle | ..................... | B60G 7/02 267/293 |
| 2006/0255557 A1* | 11/2006 | Hass | ...................... | B60G 7/001 280/124.116 |
| 2008/0084047 A1* | 4/2008 | Bluff | ........................ | B60G 7/02 280/423.1 |
| 2009/0072505 A1* | 3/2009 | McGinnis | .............. | B60G 9/003 280/124.116 |
| 2010/0327486 A1 | 12/2010 | Kuki et al. | | |
| 2013/0043719 A1* | 2/2013 | Wietharn | ........... | B62D 55/0842 305/120 |
| 2013/0069333 A1* | 3/2013 | Pizzeta | .................... | B60G 5/03 280/124.116 |
| 2014/0265205 A1* | 9/2014 | Dudding | .................. | B60G 9/02 280/124.116 |
| 2016/0152104 A1* | 6/2016 | Spielmann | ............. | B60G 7/001 280/124.116 |
| 2016/0176439 A1* | 6/2016 | Spielmann | ............. | B62D 65/00 280/124.103 |
| 2017/0253098 A1* | 9/2017 | Jansen | ................... | B60G 7/001 |

OTHER PUBLICATIONS http://www.kll.com.br/produtos/suspensao-pneumatica-para-veiculos-pesados-nas-versoes-4x2-6x2-e-6x4/.
United States Patent Office; International Search Report; dated Apr. 24, 2017.

* cited by examiner

POWERED VEHICLE SUSPENSION ASSEMBLY

BACKGROUND OF THE INVENTION

The present invention relates to a powered vehicle suspension assembly, and in particular to a powered vehicle suspension assembly for use with medium and heavy duty trucks such as semi-tractors, wherein an air suspension assembly is utilized without the use of track rods.

BRIEF SUMMARY OF THE INVENTION

One embodiment provides a powered vehicle suspension assembly that includes a mounting bracket configured to be attached to a powered vehicle frame rail, and a trailing arm assembly that includes a substantially rigid trailing arm member having a first portion and a second portion, where the first portion has a first end pivotably coupled to the mounting bracket and a second end opposite the first end, the second portion has a first end and a second end opposite the first end of the second portion, and wherein the second end of the first portion and the first end of the second portion are configured to cooperate to secure a powered vehicle axle arrangement therebetween, at least one mechanical fastener coupling the second end of the first portion of the trailing arm to the first end of the second portion of the trailing arm. The powered vehicle suspension assembly further includes a spring arrangement supported by the second end of the second portion, a bushing arrangement pivotably coupling the first end of the first portion of the trailing arm member to the mounting bracket, wherein the bushing arrangement has a greater compliance in a vertical direction than in a horizontal direction, and a structural reinforcement cross-member configured to extend between and couple with a pair of powered vehicle frame rails.

Another embodiment includes a powered vehicle suspension assembly that comprises a mounting bracket configured to be attached to a powered vehicle frame rail, a trailing arm assembly including a substantially rigid trailing arm having a first end pivotably coupled with the mounting bracket and a second end, where the trailing arm assembly is configured to operably couple with a powered vehicle axle arrangement, a spring arrangement supported by the second end of the trailing arm, and a structural reinforcement cross-member configured to extend between and couple with a pair of powered vehicle frame rails.

Yet another embodiment provides a powered vehicle assembly that includes a pair of vehicle frame rails spaced from one another, a mounting bracket attached to one of the vehicle frame rails, a trailing arm assembly including a substantially rigid trailing arm having a first end pivotably coupled with the mounting bracket and a second end, a powered vehicle axle assembly including an axle housing and a powered axle member rotatably positioned within the axle housing, where the substantially rigid trailing arm is coupled to the axle housing, a spring arrangement extending between the second end of the substantially rigid trailing arm and one of the vehicle frame rails, and a structural reinforcement cross-member extending between and coupled with the vehicle frame rails.

The various embodiments provide a more durable design with reduced manufacturing costs, reduce the overall complexity and the total number of components to assemble and maintain, are efficient in use, capable of a long operating life, and are particularly well adapted for the proposed uses.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
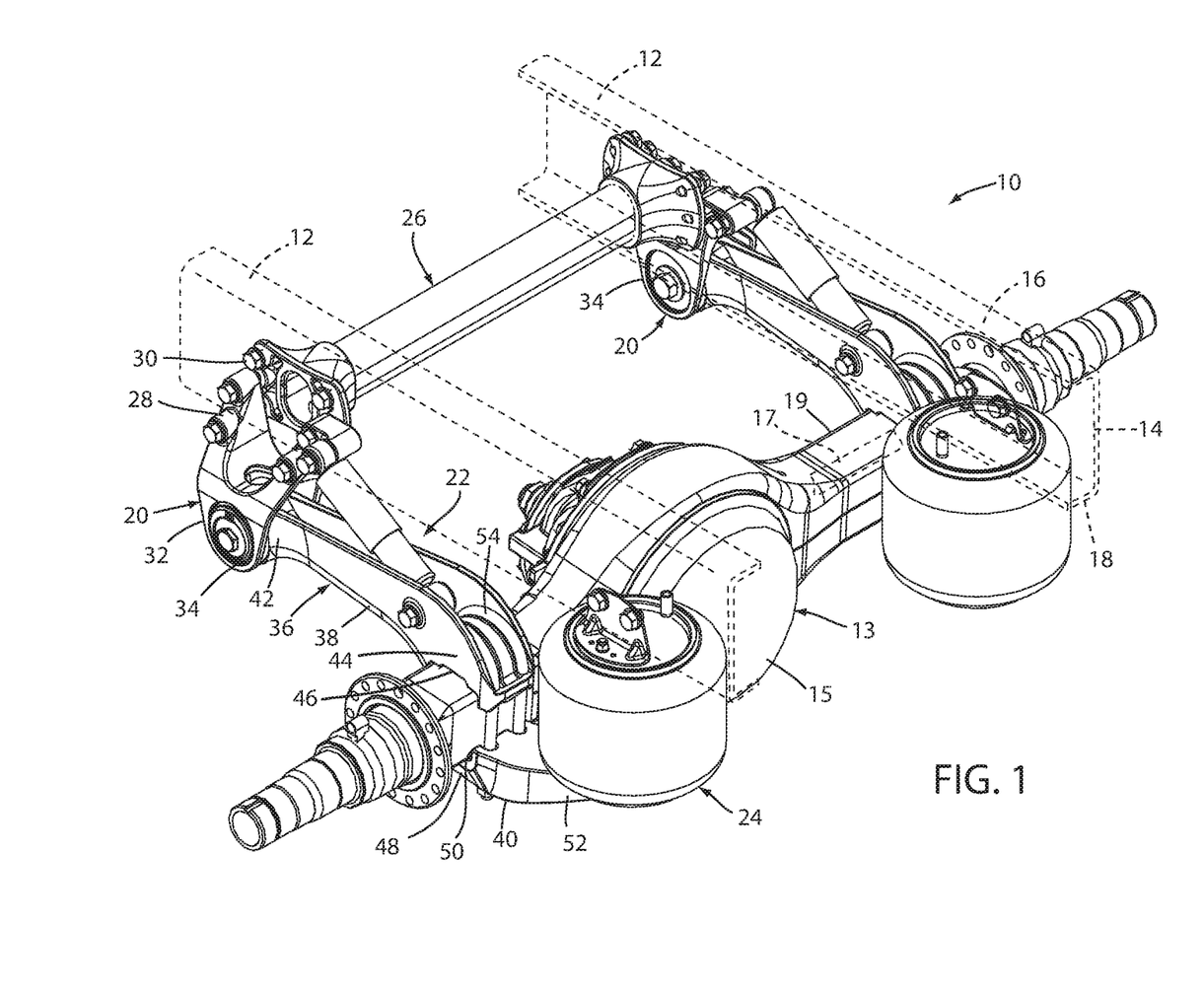
FIG. 1 is a perspective view of an embodiment of a powered vehicle suspension assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1 and 2) generally designates an embodiment of a powered vehicle suspension assembly. In the illustrated example, the suspension assembly 10 is configured for use within a powered vehicle assembly 7 that includes a powered vehicle such as a tractor 8 having an engine 9 and configured to tow a trailer 11, wherein the powered vehicle or tractor 8 includes a pair of longitudinally-extending vehicle frame rails 12, and a drive axle arrangement 13 that includes a differential 15 that receives power from a drive shaft (not shown) and an axle shaft 17 rotatably positioned within an axle housing 19. In the illustrated example, the suspension assembly 10 supports the pair of vehicle frame rails 12 each having a C-shaped cross-sectional configuration and including a vertical portion 14, a top horizontal portion 16, and a bottom horizontal portion 18, however, other suitable configurations may also be utilized.

Figure 2:
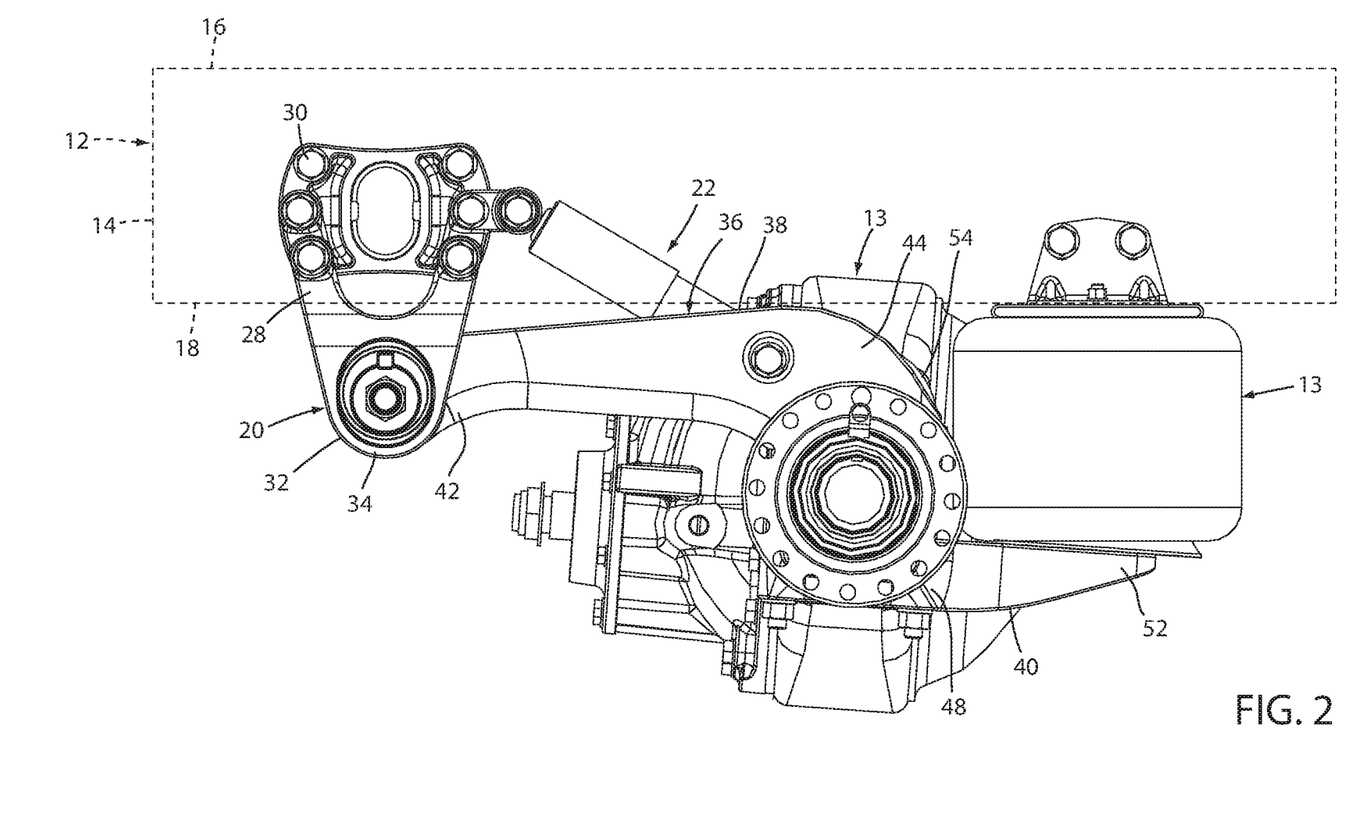
FIG. 2 is a side elevational view of the powered vehicle suspension assembly.
Figure 3:
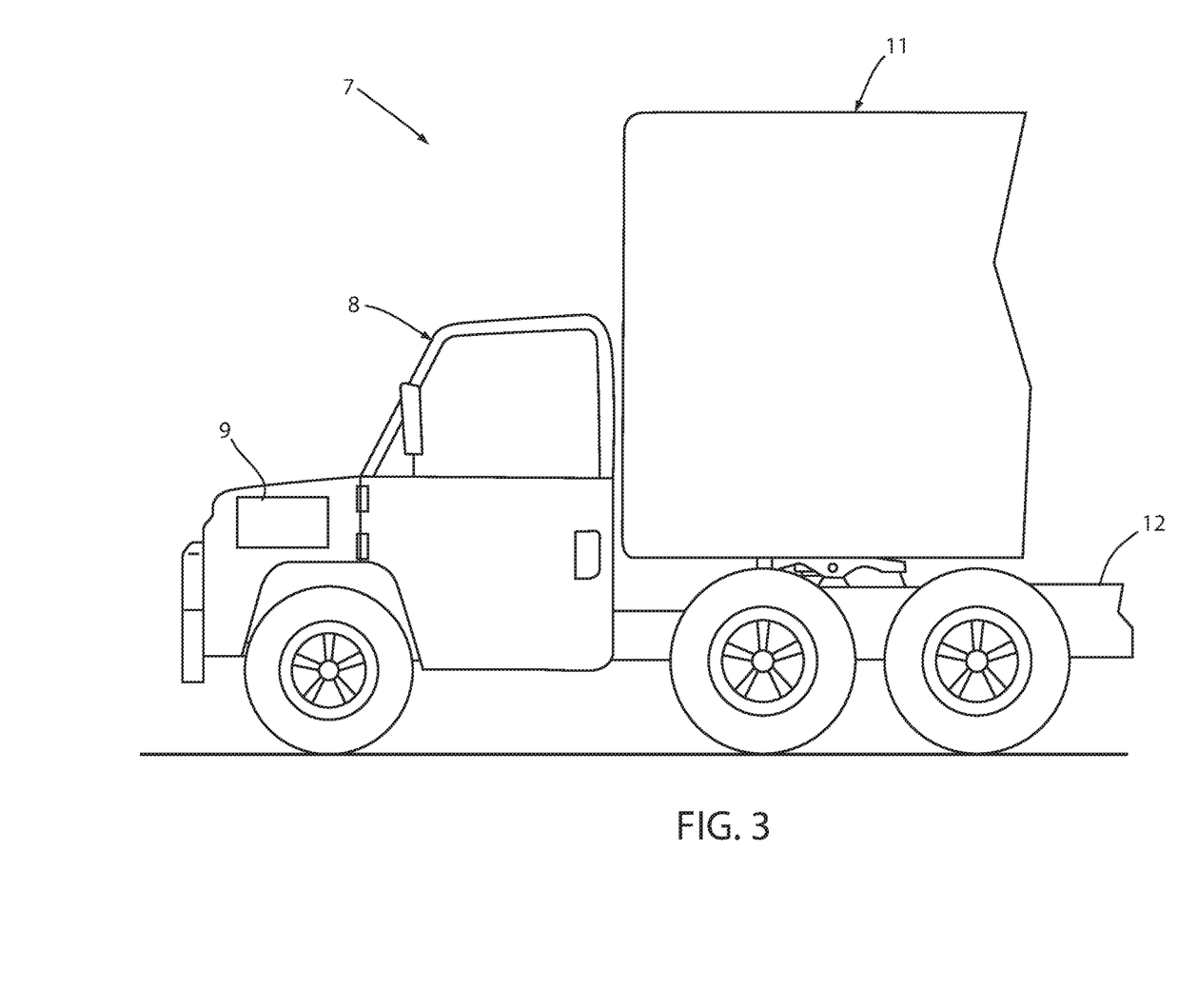
FIG. 3 is a side elevational view of a powered vehicle assembly including a powered vehicle and a towed vehicle.

The suspension assembly 10 includes a pair of mounting brackets 20, a pair of substantially rigid trailing arm or beam assemblies 22, air spring assemblies 24, and a structural reinforcement cross-member 26 extending between the frame rails 12.

In the illustrated example, each mounting bracket 20 includes an upper portion 28 coupled to the vertical portion 14 of an associated vehicle frame rail 12 by a plurality of mechanical fasteners such as bolts 30, and a lower portion 32 that includes a pair of spaced apart, downwardly-extending flanges 34.

Figure 4:
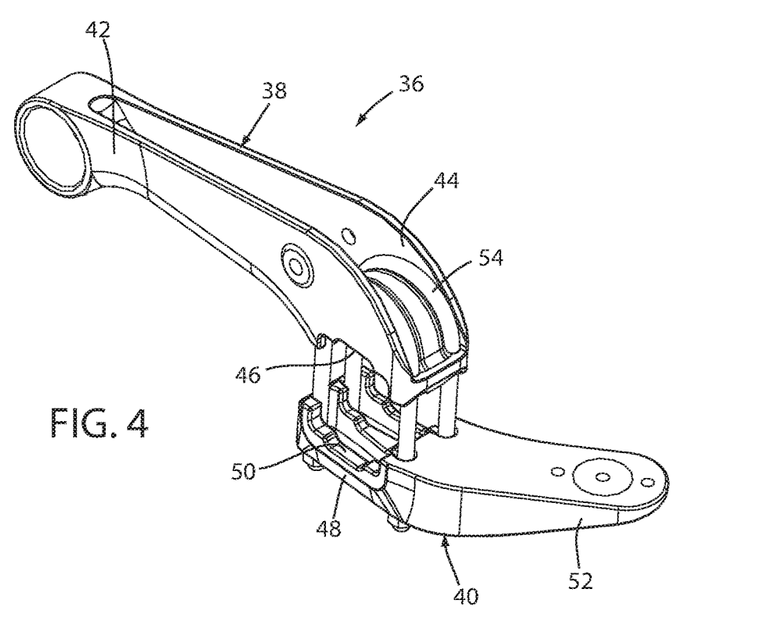
FIG. 4 is a perspective view of a trailing arm assembly.
Figure 5:
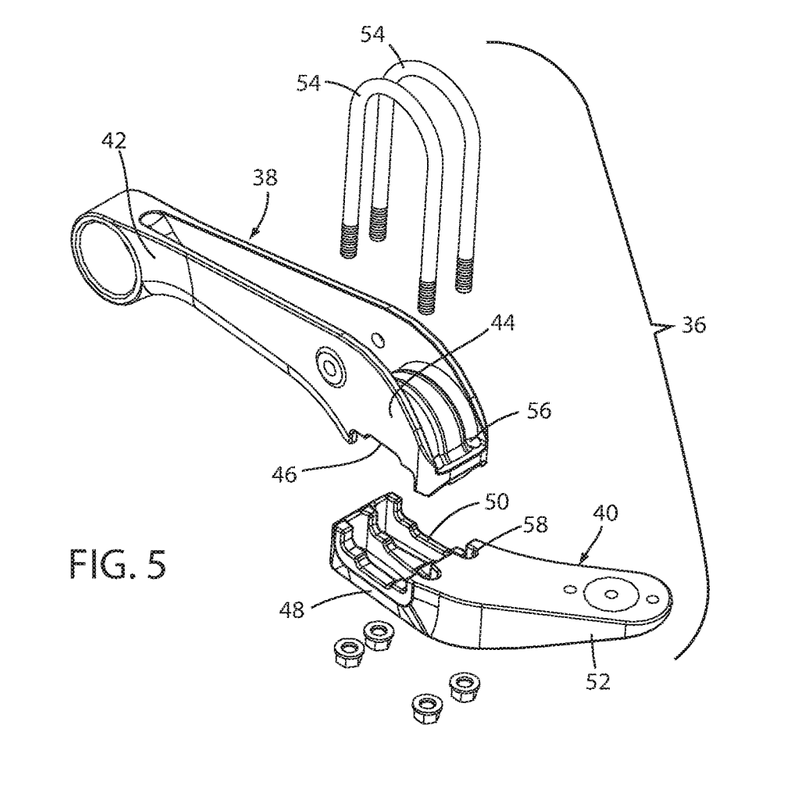
FIG. 5 is an exploded perspective view of the trailing arm assembly.

Each trailing arm assembly 22 (FIGS. 4 and 5) includes a substantially rigid trailing arm 36 having a first portion 38 and a second portion 40. The first portion 38 includes a first end 42 received between the flanges 34 pivotably coupled to the associated mounting bracket 20, and a second end 44 that includes a downwardly-opening, C-shaped relief 46 that receives the axle housing 19 therein. The first portion 38 of each rigid trailing arm 36 has an upwardly-opening, U-shaped cross-sectional configuration extending from the first end 42 to the second end 44. The second portion 40 of the trailing arm 36 includes a first end 44 having an upwardly-opening, C-shaped relief 50 that receives the axle housing 19 therein, and a second end 52 operably supporting the air spring assembly 24 between the trailing arm 36 and the associated vehicle frame rail 12. The trailing arm assembly 22 further includes a plurality of mechanical fasteners, such as a pair of U-shaped bolts 54 each extending downwardly and received through apertures 56 of the first portion 38 and apertures 58 of the second portion 40, thereby securing the axle housing 19 between the first portion 38 and the second portion 40 and within the reliefs 46, 50. Alternatively, the first and second portions 38, 40 may be welded to the axle housing 19 and/or to one another.

Figure 6:
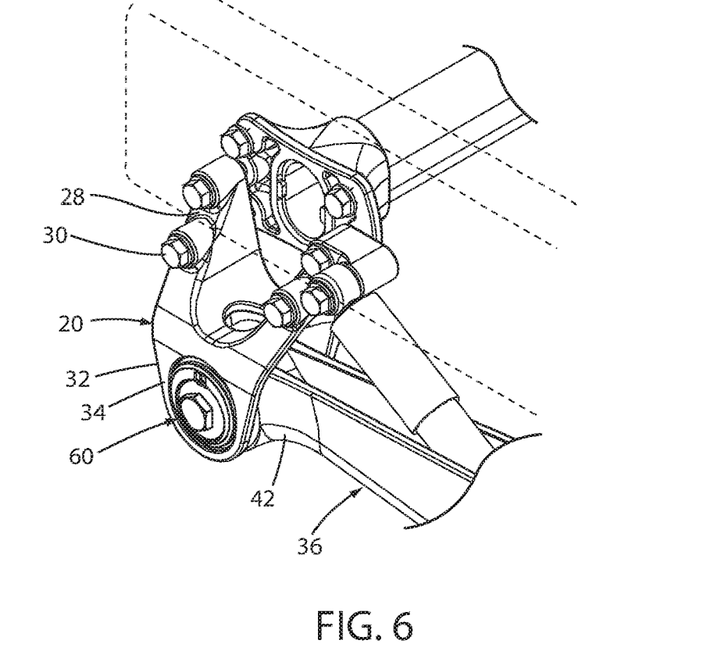
FIG. 6 is an enlarged perspective view of a bushing assembly.
Figure 7:
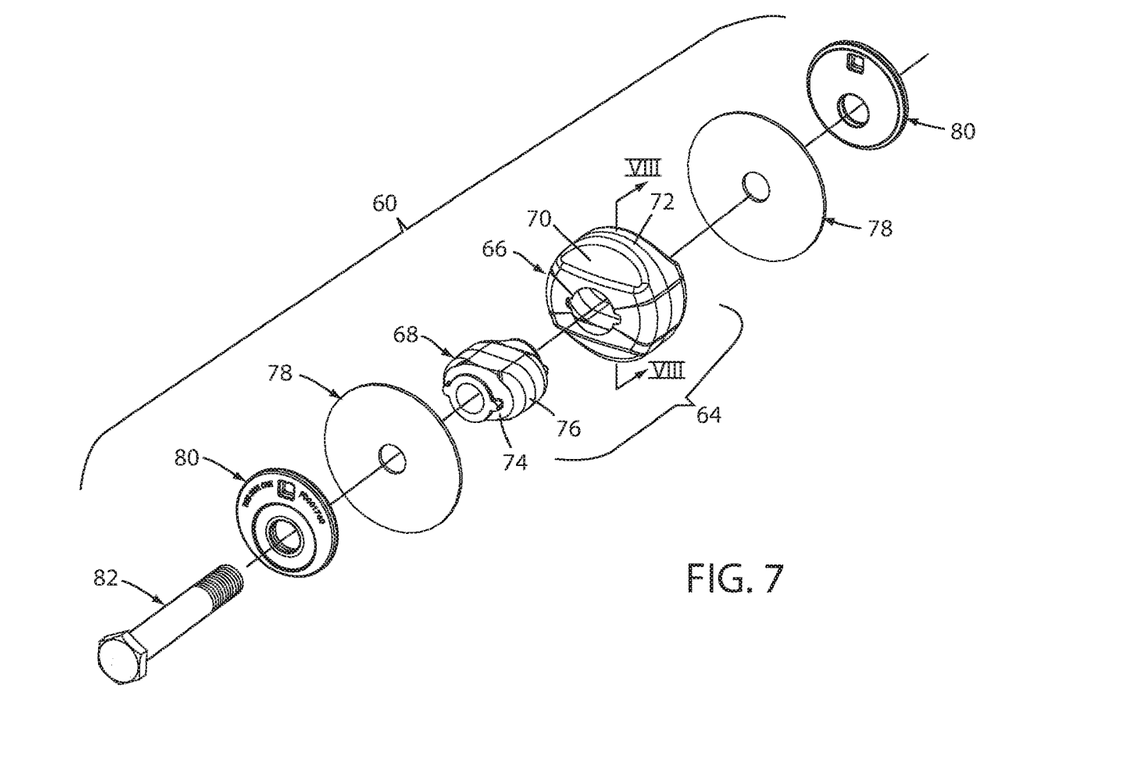
FIG. 7 is an exploded perspective view of the bushing assembly.
Figure 8:
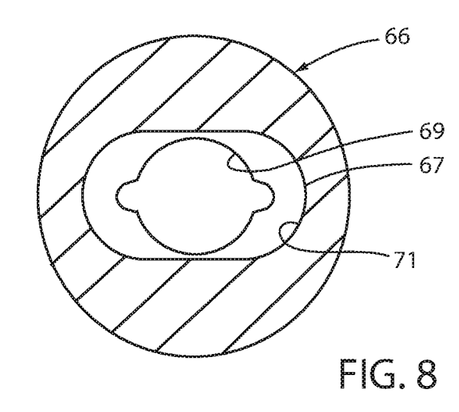
FIG. 8 is a cross-sectional side view of a bushing member of the bushing assembly taken along the line VII-VII, FIG. 6.

The first end 42 of the first portion 38 of each trailing arm 36 is pivotably coupled to an associated mounting bracket 20 via a bushing assembly 60 (FIGS. 6 and 7). The bushing assembly 60 includes a bushing arrangement 64 that includes an elastically resilient bushing member 66 surrounding a rigid core member 68. In the illustrated example, the bushing member 66 is configured so as to be more compliant in a vertical direction than in a horizontal direction. Specifically, the bushing member 66 includes a plurality of reliefs 70 extending radially inward from an outer peripheral surface 72. As illustrated, the reliefs are positioned at the ends of the bushing member 66 and paired vertically with one another. As best illustrated in FIG. 8, each bushing member 66 includes an interior space 67 having narrowed end portions 69 and a relatively widened center portion 71 such that the relative thickness of the bushing member 66 is less in a horizontal direction than in a vertical direction resulting in a reduced compliance in a horizontal direction as compared to the vertical direction. The core member 68 includes narrowed ends 74 and a relatively widened center portion 76 positioned therebetween. The center portion 76 is preferably oriented in a horizontal direction so as to decrease the compliance of the bushing arrangement 64 in a horizontal direction relative to a vertical direction. The bushing arrangement 64 further includes a pair of spacing washers 78 located at the ends of the bushing arrangement 64 and a fore-and-aft positioning adjustment arrangement 80. A bolt 82 secures the remainder of the components of the bushing assembly 60 in place.

Figure 9:
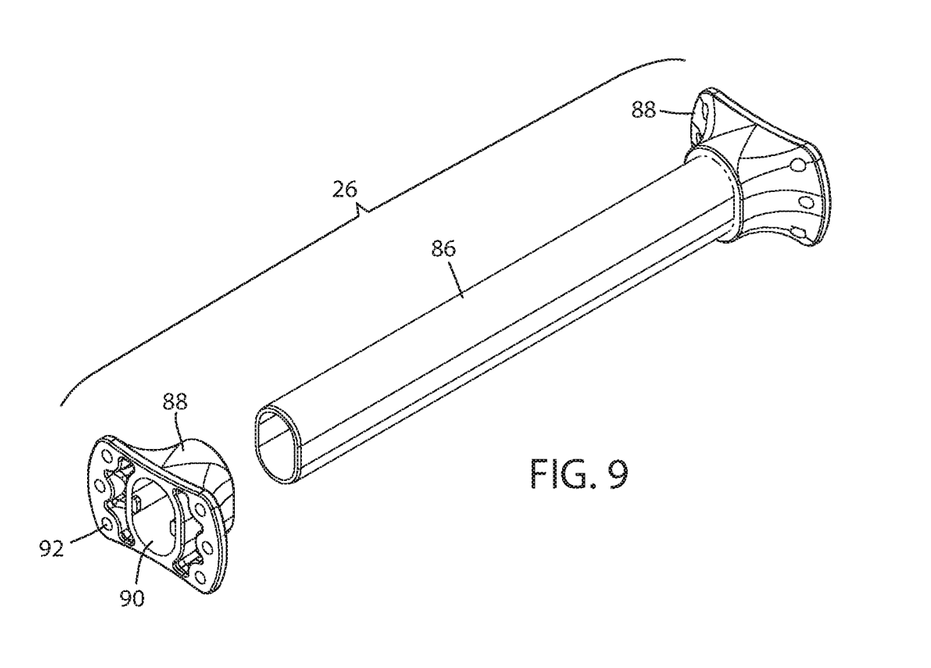
FIG. 9 is an exploded perspective view of a cross-member.

The cross-member 26 (FIGS. 1 and 9) includes a cross beam 86 having a square-shaped, cross-sectional configuration, and a pair of mounting members 88 each having a square-shaped opening 90 that receives a corresponding end of the cross beam 86 therein. Of course, other cross-sectional configurations for the cross beam 86 and other complimentary shapes for the openings 90 may also be utilized. A plurality of apertures 92 within each mounting member 88 receives the bolts 30 to secure the mounting members 88 and the cross-member 26 to the frame rails 12. Alternatively, the mounting member 88 may be welded to the frame rails 12.

The various embodiments provide a more durable design with reduced manufacturing costs, are efficient in use, capable of a long operating life, and are particularly well adapted for the proposed uses.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A powered vehicle suspension assembly, comprising;
   a mounting bracket configured to be attached to a powered vehicle frame rail;
   a trailing arm assembly, comprising:
      a substantially rigid trailing arm member having a first portion and a second portion, the first portion having a first end pivotably coupled to the mounting bracket and a second end opposite the first end, the second portion having a first end and a second end opposite the first end of the second portion, where the second end of the first portion and the first end of the second portion are configured to cooperate to secure a powered vehicle axle arrangement therebetween, and wherein the first end of the second portion is spaced from the mounting bracket; and
      at least one mechanical fastener coupling the second end of the first portion of the trailing arm to the first end of the second portion of the trailing arm;
   a spring arrangement supported by the second end of the second portion;
   a bushing arrangement pivotably coupling the first end of the first portion of the trailing arm member to the mounting bracket, wherein the bushing arrangement has a greater compliance in a vertical direction than in a horizontal direction; and
   a structural reinforcement cross-member configured to extend between and couple with a pair of powered vehicle frame rails;
   wherein the powered vehicle suspension assembly does not include a torque rod.

2. The powered vehicle suspension assembly of claim 1, wherein the bushing arrangement includes a substantially rigid core member received within an elastically resilient bushing member, the core member has opposite end portions each having a first width and a center portion positioned between the end portions and having a second width that is greater than the first width, and wherein the bushing member includes at least one relief extending radially inward from an outer peripheral surface.

3. The powered vehicle suspension assembly of claim 2, wherein the at least one relief of the bushing member extends radially inward in a vertical direction.

4. The powered vehicle suspension assembly claim 2, wherein the at least one relief of the bushing member includes a plurality of reliefs.

5. The powered vehicle suspension assembly of claim 2, wherein the at least one relief includes at least two vertically aligned reliefs.

6. The powered vehicle suspension assembly claim 1, wherein the second end of the first portion of the trailing arm member includes a downward-opening relief that is configured to receive a powered vehicle axle therein, and wherein the first end of the second portion of the trailing arm member includes a upwardly-opening relief that is configured to receive a powered vehicle axle therein.

7. The powered vehicle suspension assembly of claim 2, wherein the second width of the bushing core is positioned horizontally.

8. The powered vehicle suspension assembly of claim 1, wherein the powered vehicle suspension assembly does not include a track rod.

9. The powered vehicle suspension assembly of claim 1, wherein the at least one mechanical fastener comprises a U-bolt.

10. A powered vehicle suspension assembly, comprising;
a powered vehicle axle arrangement;
a mounting bracket configured to be attached to a powered vehicle frame rail;
a trailing arm assembly including a substantially rigid trailing arm having a first end pivotably coupled with the mounting bracket and a second end, where the trailing arm assembly is configured to operably couple with the powered vehicle axle arrangement;
an air spring arrangement supported by the second end of the trailing arm; and
a structural reinforcement cross-member configured to extend between and couple with a pair of powered vehicle frame rails, wherein the cross-member is co-located with the mounting bracket along a length of the frame rail; and
wherein the powered vehicle suspension assembly does not include a track rod, and wherein the powered vehicle suspension assembly does not include a torque rod;
wherein the substantially rigid trailing arm member includes a first portion pivotably coupled to the mounting bracket and a second portion supporting the spring arrangement, wherein the second portion is separate from the first portion; and
wherein the first portion and the second portion are configured to cooperate to secure the powered vehicle axle arrangement therebetween.

11. The powered vehicle suspension assembly of claim 10, further comprising:
a bushing arrangement pivotably coupling the first end of the trailing arm member to the mounting bracket, wherein the bushing arrangement has a greater compliance in a vertical direction than in a horizontal direction.

12. The powered vehicle suspension assembly of claim 11, wherein the bushing arrangement includes a bushing member includes at least one relief extending radially inward from an outer peripheral surface.

13. The powered vehicle suspension assembly of claim 12, wherein the at least one relief of the bushing member extends radially inward in a vertical direction.

14. The powered vehicle suspension assembly of claim 12, wherein the at least one relief of the bushing member includes a plurality of reliefs.

15. The powered vehicle suspension assembly of claim 12, wherein the at least one relief includes at least two vertically aligned reliefs.

16. The powered vehicle suspension assembly of claim 11, wherein the bushing arrangement includes a substantially rigid core member received within an elastically resilient bushing member, the core member has opposite end portions each having a first width and a center portion positioned between the end portions and having a second width that is greater than the first width.

17. The powered vehicle suspension assembly of claim 16, wherein the second width of the core member is positioned horizontally.

18. The powered vehicle suspension assembly of claim 10, wherein the trailing arm assembly further includes at least one mechanical fastener coupling the first portion of the trailing arm to the second portion of the trailing arm.

19. The powered vehicle suspension assembly of claim 10, wherein the first portion of the trailing arm member includes a downward-opening relief that is configured to receive a powered vehicle axle therein, and wherein the second portion of the trailing arm member includes a upwardly-opening relief that is configured to receive the powered vehicle axle therein.

20. A powered vehicle suspension assembly, comprising;
a powered vehicle axle arrangement;
a mounting bracket configured to be attached to a powered vehicle frame rail;
a trailing arm assembly including a substantially rigid trailing arm that includes a first portion having a first end pivotably coupled with the mounting bracket and a second end extending only above the powered vehicle axle arrangement, and a second portion having a first end configured to operably couple with the powered vehicle axle arrangement and extending only below the powered vehicle axle arrangement and a second end;
an air spring arrangement supported by the second end of the second portion of the trailing arm; and
a structural reinforcement cross-member configured to extend between and couple with a pair of powered vehicle frame rails, wherein the cross-member is co-located with the mounting bracket along a length of the frame rail; and
wherein the powered vehicle suspension assembly does not include a track rod;
wherein the trailing arm assembly further includes at least one mechanical fastener coupling the first portion of the trailing arm to the second portion of the trailing arm; and
wherein the at least one mechanical fastener includes a U-bolt.

21. A powered vehicle suspension assembly, comprising;
a powered vehicle axle arrangement;
a mounting bracket configured to be attached to a powered vehicle frame rail;
a trailing arm assembly including a substantially rigid trailing arm having a first end pivotably coupled with the mounting bracket and a second end, where the trailing arm assembly is configured to operably couple with the powered vehicle axle arrangement;
an air spring arrangement supported by the second end of the trailing arm; and
a structural reinforcement cross-member configured to extend between and couple with a pair of powered vehicle frame rails, wherein the cross-member is co-located with the mounting bracket along a length of the frame rail; and
wherein the powered vehicle suspension assembly does not include a track rod;
wherein the substantially rigid trailing arm member includes a first portion pivotably coupled to the mounting bracket and that abuts the powered vehicle axle arrangement and a second portion supporting the spring arrangement and that abuts the powered vehicle axle arrangement, wherein the second portion is separate from the first portion; and wherein the first portion of the trailing arm member includes a downward-opening relief that is configured to receive a powered vehicle axle therein, and wherein the second portion of the trailing arm member includes a upwardly-opening relief that is configured to receive the powered vehicle axle therein;

wherein the first portion is an integral, single-piece and the second portion is an integral, single-piece.

\* \* \* \* \*

UNITED STATES PATENT AND TRADEMARK OFFICE
CERTIFICATE OF CORRECTION

PATENT NO. : 10,632,807 B2
APPLICATION NO. : 15/547381
DATED : April 28, 2020
INVENTOR(S) : Galla et al.

Page 1 of 2

It is certified that error appears in the above-identified patent and that said Letters Patent is hereby corrected as shown below:

In the Specification

Column 2, Line 12:
After "vehicle" insert -- suspension --

Column 2, Lines 22-23:
"VII-VII, Fig. 6" should be — VIII-VIII, Fig. 7 —

Column 3, Line 65:
"complimentary" should be — complementary —

In the Claims

Column 4, Claim 1, Line 15:
";" should be — : —

Column 4, Claim 4, Line 57:
After "assembly" insert -- of --

Column 4, Claim 6, Line 63:
After "assembly" insert -- of --

Column 5, Claim 6, Line 1:
"a" should be — an —

Column 5, Claim 10, Line 12:
";" should be — : —

Column 5, Claim 10, Line 22:
Delete "and"

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*

Column 5, Claim 12, Line 50:
"includes" should be — including —

Column 6, Claim 19, Line 10:
"downward-opening" should be — downwardly-opening —

Column 6, Claim 19, Line 12:
"a" should be — an —

Column 6, Claim 20, Line 15:
";" should be — : —

Column 6, Claim 20, Line 28:
Delete "and"

Column 6, Claim 21, Line 42:
";" should be — : —

Column 6, Claim 21, Line 52:
Delete "and"

Column 6, Claim 21, Line 67:
Delete "and"

Column 7, Claim 21, Line 2:
"downward-opening" should be — downwardly-opening —

Column 7, Claim 21, Line 5:
"a" should be — an —

Column 7, Claim 21, Line 6:
After "therein;" insert -- and --